United States Patent
Lin et al.

(10) Patent No.: US 11,481,018 B2
(45) Date of Patent: Oct. 25, 2022

(54) METHOD FOR WEBCAM PRIVACY PROTECTION IMPLEMENTATION

(71) Applicant: Hewlett-Packard Development Company, L.P., Spring, TX (US)

(72) Inventors: Te-Yueh Lin, Taipei (TW); Hao-Cheng Chuang, Taipei (TW); Chien Chung Chien, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/982,239

(22) PCT Filed: Jun. 28, 2018

(86) PCT No.: PCT/US2018/039885
§ 371 (c)(1),
(2) Date: Sep. 18, 2020

(87) PCT Pub. No.: WO2020/005243
PCT Pub. Date: Jan. 2, 2020

(65) Prior Publication Data
US 2021/0165480 A1    Jun. 3, 2021

(51) Int. Cl.
*G06F 1/3234* (2019.01)
*G06F 1/16* (2006.01)
*G06F 1/3215* (2019.01)
*G06F 1/3287* (2019.01)

(52) U.S. Cl.
CPC .......... *G06F 1/3278* (2013.01); *G06F 1/1686* (2013.01); *G06F 1/3215* (2013.01); *G06F 1/3287* (2013.01)

(58) Field of Classification Search
CPC .... G06F 1/1686; G06F 1/3287; G06F 1/3215; G06F 1/325; G06F 1/3278; Y02D 10/00
See application file for complete search history.

(56) References Cited

U.S. PATENT DOCUMENTS

| | | | |
|---|---|---|---|
| 8,612,788 B2 | 12/2013 | Heieh | |
| 9,209,624 B2* | 12/2015 | Hoff | H02J 13/00028 |
| 2005/0055432 A1 | 3/2005 | Rodgers | |
| 2008/0178282 A1* | 7/2008 | Yoffe | G06F 21/70 |
| | | | 726/17 |
| 2012/0151606 A1 | 6/2012 | Hannon | |

(Continued)

FOREIGN PATENT DOCUMENTS

| CN | 1991660 A | 7/2007 |
|---|---|---|
| CN | 100472402 C | 3/2009 |

(Continued)

*Primary Examiner* — Chun Cao
(74) *Attorney, Agent, or Firm* — HPI Patent Department (57) ABSTRACT

In one example, an electronic device may include a power source to supply power to a peripheral device, a sensor circuit to monitor a power consumption of the peripheral device, and a controller coupled to the sensor circuit to detect that the power consumption of the peripheral device is greater than a threshold and generate a popup message on a user interface of the electronic device based on the detection. The popup message may include an option. Further, the controller may direct the power source to continue to provide the power to the peripheral device in response to a determination that the option is selected prior to an expiration of a timer.

15 Claims, 4 Drawing Sheets

(56) References Cited

U.S. PATENT DOCUMENTS

| | | |
|---|---|---|
| 2013/0222609 A1 | 8/2013 | Soffer |
| 2014/0194782 A1* | 7/2014 | Rahman ............... A61B 5/0002 |
| | | 600/595 |
| 2015/0213290 A1 | 7/2015 | Kim et al. |
| 2016/0034024 A1* | 2/2016 | Mergen .............. G08B 21/0484 |
| | | 713/323 |
| 2017/0185134 A1 | 6/2017 | Han et al. |
| 2017/0263254 A1* | 9/2017 | Dewan .................... G06F 3/165 |
| 2017/0289443 A1 | 10/2017 | Nguyen et al. |
| 2018/0165472 A1* | 6/2018 | Adams ................... G06F 21/83 |
| 2018/0246832 A1* | 8/2018 | Nevalainen ............. G06F 13/12 |
| 2020/0178374 A1* | 6/2020 | Holtman ................ H05B 47/10 |

FOREIGN PATENT DOCUMENTS

| | | |
|---|---|---|
| CN | 101964038 B | 11/2016 |
| EP | 3062567 A1 | 8/2016 |
| WO | WO-2016022586 A1 | 2/2016 |

\* cited by examiner

METHOD FOR WEBCAM PRIVACY PROTECTION IMPLEMENTATION

BACKGROUND

With recent technological developments, electronic devices having diverse functionalities have been developed. Example electronic devices may include smart phones, tablet computers, laptop computers, smart televisions (TVs), internet protocol televisions (IPTVs), and the like. The electronic devices may not only display digital content such as images but may also run a diverse selection of applications. The electronic devices may be equipped with a camera that records images (e.g., still and/or video). Users of such display devices may utilize the recorded images with various applications such as, for example, video conferencing, email, and instant messaging.

BRIEF DESCRIPTION OF THE DRAWINGS

Examples are described in the following detailed description and in reference to the drawings, in which.

DETAILED DESCRIPTION

Electronic devices may be equipped with a microphone to detect voice signals (e.g., voice commands) and a camera to record images (e.g., still and/or video). Users of such electronic devices may utilize the images with applications such as, for example, video conferencing, email, and instant messaging. However, hackers or unauthorized persons may enable the microphone or the camera on such electronic devices without a user's knowledge or permission. In some electronic devices (e.g., notebook computers), the microphone power and/or the camera power may turn on when the electronic device is in a power-on mode. However, the microphone and/or the camera may not be used even though the electronic device is in the power-on mode.

In such examples, the camera may be utilized by hackers or other unauthorized persons to record images of the end user and/or the location (e.g., home, office, car, and the like) in which the end user is utilizing the electronic device. The recorded images may be used, transmitted, forwarded, sent, distributed, and/or displayed without the user's knowledge or permission. This may cause security, privacy, inconvenience, and/or other concerns for the users of such electronic devices. Similarly, the microphone may be utilized by hackers or other unauthorized persons to record audio of the end users.

Some example ways in which a camera of an electronic device may be disabled is to utilize a moveable door or other cover that blocks light from entering lens of the camera to prevent recordation of images. However, such moveable doors or covers may require an electronic device to have a certain minimum thickness, which can prevent utilization of such moveable doors or covers in electronic devices that are designed to be thin such as, for example, some tablets and phones. Moveable doors or covers may also add to an overall cost of the electronic device.

Other example ways in which a camera of an electronic device may be disabled is to utilize an opaque tape to block light from entering the lens of the camera to prevent recordation of images. However, such opaque tape, when removed, may leave a residue on the lens of the camera which may degrade the quality (e.g., sharpness, contrast, color, and the like) of the images recorded by the camera. Also, such opaque tape may not be readily available to an end user when the user wants to disable the camera.

Additional example ways in which a camera of an electronic device may be disabled is to utilize a driver (e.g., machine-readable instructions) of the camera to disable the camera to prevent recordation of images. A potential issue with the use of such camera driver to disable the camera is that such camera driver can be hacked or otherwise compromised to enable the camera on the electronic device without a user's knowledge or permission.

Examples described herein may securely enable or disable a camera or a microphone of an electronic device via generating a pop-up message when the camera or the microphone starts working. The pop-up message may include an option. The option, when selected prior to an expiration of a timer, may continue to provide power to the camera or the microphone. Further, the power to the camera or the microphone can be turned off when the timer expires without the selection of the option. Thus, examples described herein may enhance security and protect a user's privacy during the power-on mode of the electronic device.

In the following description, for purposes of explanation, numerous specific details are set forth in order to provide a thorough understanding of the present techniques. It will be apparent, however, to one skilled in the art that the present apparatus, devices and systems may be practiced without these specific details. Reference in the specification to "an example" or similar language means that a particular feature, structure, or characteristic described is included in at least that one example, but not necessarily in other examples.

Examples described herein may provide an electronic device including a sensor circuit and a controller coupled to the sensor circuit. The sensor circuit may monitor a power consumption of a peripheral device (e.g., a microphone or a camera). For example, the peripheral device is to consume low power in an idle mode and high power in an active mode. Further, the controller may detect that the power consumption of the peripheral device corresponds to the active mode and generate a popup message including an option on a user interface of the electronic device. In some examples, the power consumption of the peripheral device increases (i.e., to the high power) when the peripheral device starts working. The controller may direct a power source to continue to provide the power to the peripheral device in response to determining that the option is selected prior to an expiration of a timer, or else, turn off the power source.

As used herein, the term "electronic device" may represent, but is not limited to, a computer, a server, a notebook, a tablet, a monitor, a phone, a personal digital assistant, a kiosk, a television, a display, or a combination thereof. As used herein, the term "camera" may represent, but is not limited to, a device that records images, still and/or video, by utilizing a lens assembly, shutter, associated electronics, and a photosensitive member. Example photosensitive member may include, but is not limited to, a charge-coupled device (CCD) or a complementary metal-oxide semiconductor (CMOS). As used herein, the term "microphone" may represent, but is not limited to, a device that records voice signals.

Figure 1:
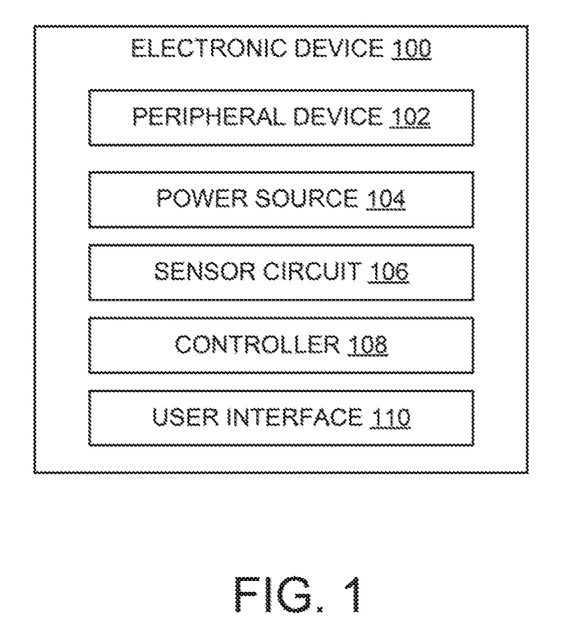
FIG. 1 is a block diagram of an example electronic device, including a controller to monitor a power consumption of a peripheral device via a sensor circuit.

Turning now to the figures, FIG. 1 is a block diagram of an example electronic device 100, including a controller 108 to monitor a power consumption of a peripheral device 102 via a sensor circuit 106. Example peripheral device 102 may be a microphone or a camera. Further, peripheral device 102 may turn on when electronic device 100 is in a power-on mode.

Electronic device 100 may include a power source 104, sensor circuit 106, and controller 108 coupled to sensor circuit 106. Example controller 108 may be an embedded controller. Example embedded controller may be an embedded keyboard controller. In some examples, the components of electronic device 100 may be implemented in hardware, machine-readable instructions, or a combination thereof. In one example, controller 108 may be implemented as engines or modules comprising any combination of hardware and programming to implement the functionalities described herein.

During operation, power source 104 may supply power to peripheral device 102. In one example, power source 104 may be a switch circuit that can be turned off or turned on via a control signal. Power source 104 may be connected between a power supply (Vcc) and peripheral device 102 to supply or cut off the power from the Vcc to peripheral device 102. For example, power source 104 may include a power input end to receive the input power from the Vcc and convert the input power into an output power, a power output end to output the output power to peripheral device 102, and a switch pin/enable pin to receive the control signal to supply or cut off the power to peripheral device 102.

Further during operation, sensor circuit 106 may monitor a power consumption of peripheral device 102. In one example, sensor circuit 106 may monitor the power consumption of peripheral device 102 during the power-on mode of electronic device 100. In the power-on mode, both electronic device 100 and peripheral device 102 may be turned on. Further, peripheral device 102 may consume low power in an idle mode and high power in an active mode. In active mode, peripheral device 102 may start working (e.g., the microphone may record voice signals, and/or the camera may record images).

Further, controller 108 may detect that the power consumption of peripheral device 102 is greater than a threshold. For example, the threshold may be an indicative of a power level beyond which peripheral device 102 starts working. The threshold may be set based on a power specification of peripheral device 102. In some examples, the power specification of peripheral device 102 may be stored in a storage associated with electronic device 100.

Upon detecting that the power consumption of peripheral device 102 is greater than the threshold, controller 108 may generate a popup message on a user interface 110 of electronic device 100. The popup message may include an option, for instance, to allow an operation of peripheral device 102.

Furthermore, controller 108 may determine whether the option is selected (i.e., via user interface 110) prior to an expiration of a timer. In one example, controller 108 may direct power source 104 to continue to provide the power to peripheral device 102 in response to a determination that the option is selected prior to the expiration of the timer. In another example, controller 108 may turn off power source 104 in response to a determination that the timer expires without the selection of the option. In some examples, controller 108 may output the control signal to the enable pin of power source 104 either to continue to supply the power or to cut off the power to peripheral device 102 based on the determination.

Figure 2:
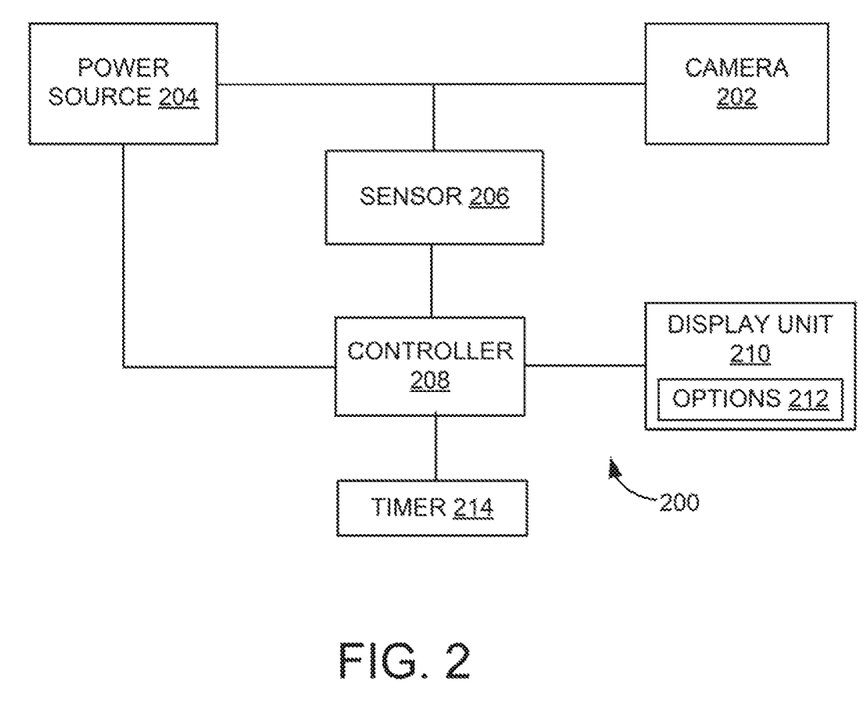
FIG. 2 is a block diagram of an example electronic device, including a controller to control an operation of a camera during a power-on mode of the electronic device.

FIG. 2 is a block diagram of an example electronic device 200, including a controller 208 to control an operation of a camera 202 during a power-on mode of electronic device 200. Electronic device 200 may include a display unit 210, and camera 202 to record an image. In one example, camera 202 may be embedded into display unit 210.

Further, electronic device 200 may include a power source 204 to supply power to camera 202. In one example, power source 204 may supply low power to camera 202 when camera 202 is in an idle mode and supply high power to camera 202 to record the image when camera 202 is in an active mode. For example, consider an example power supply to camera 202 as 3.3 Vdc. In this example, the power consumption of camera 202 during the idle mode may be about 1.65 milliwatt (mW) and the power consumption of camera 202 during the active mode may be about 591 mW.

Furthermore, electronic device 200 may include a sensor 206 coupled between power source 204 and camera 202. Sensor 206 may measure the power supplied by power source 204 to camera 202 during the power-on mode of electronic device 200. The term "power-on mode" of electronic device 200 may refer to a mode in which display unit 210 and camera 202 are turned on.

Also, electronic device 200 may include controller 208 coupled to power source 204, sensor 208, display unit 210, and a timer 214. In one example, the components of electronic device 200 may be implemented in hardware, machine-readable instructions, or a combination thereof. In one example, controller 208 may be implemented as engines or modules comprising any combination of hardware and programming to implement the functionalities described herein.

During operation, controller 208 may determine that the measured power is greater than a threshold. In one example, the measured power may be greater than the threshold when camera 202 is in the active mode. Further, controller 208 may provide options 212 on display unit 210 in response to the measured power being greater than the threshold and simultaneously initiate the timer 214. Timer 214 may be set to expire at a threshold time duration (e.g., 2 seconds). For example, timer 214 may indicate the threshold time duration to automatically disable the notification. In this example, options 212 can be selectable to enable and disable camera 202 within the threshold time duration.

Further during the operation, controller 208 may control an operation of camera 202 via power source 204 based on a selection of options 212 and timer 214. In this example, controller 208 may control power source 204 to supply or cut off the power to camera 202. In one example, controller 208 may direct power source 204 to continue to provide the power to camera 202 in response to determining that option 212 to enable camera 202 is selected prior to an expiration of timer 214. In this example, controller 208 may output a power supply signal (i.e., a control signal) to power source 204. When the power source 204 receives the power supply signal via an enable pin, power source 204 may continue to provide the power to camera 202.

In another example, controller 208 may turn off the power to camera 202 via power source 204 in response to determining that timer 214 expires prior to the selection of options 212. In other examples, controller 208 may turn off the power to camera 202 via power source 204 in response to determining that option 212 to disable camera 202 is selected prior to the expiration of timer 214. In these examples, controller 208 may output a power cut off signal (i.e., a control signal) to power source 204. When power source 204 receives the power cut off signal via the control input, power source 204 may cut off the power to camera 202. An example notification or popup message to control an operation of a camera is explained in FIGS. 3A and 38.

Figure 3A:
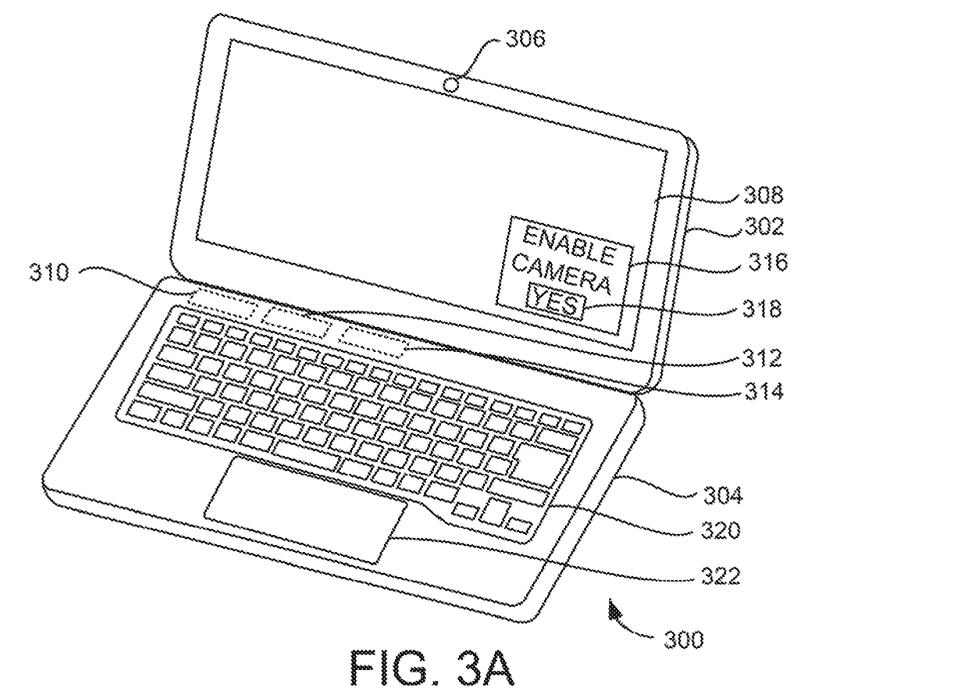
FIG. 3A is a schematic representation of an example electronic device, depicting an example notification including an option to enable an operation of a camera.
Figure 3B:
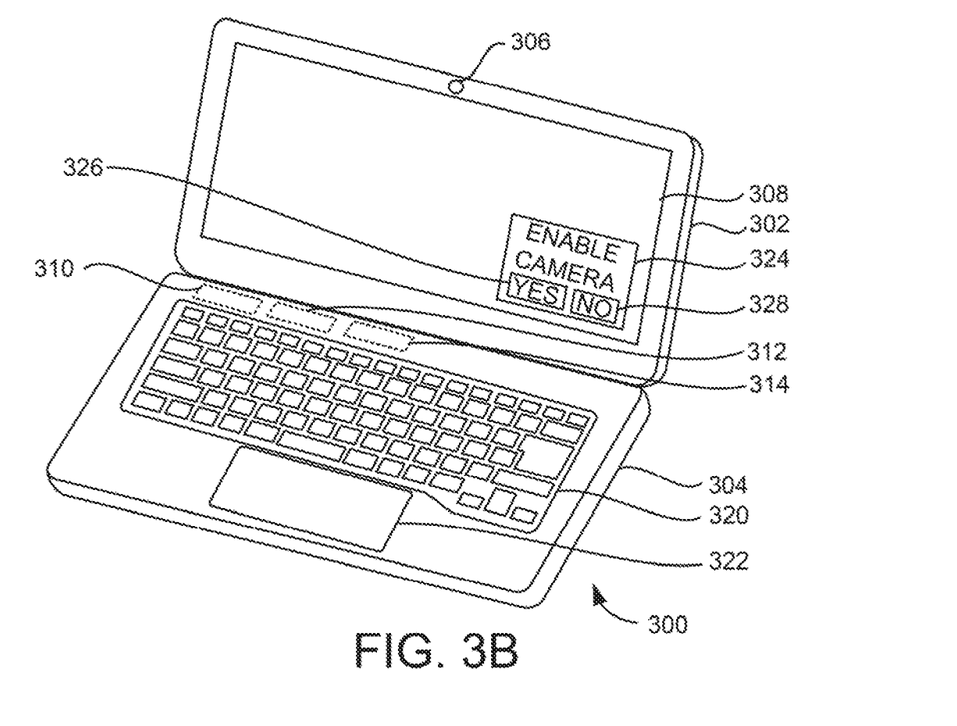
FIG. 3B is a schematic representation of the example electronic device of FIG. 3A, depicting another example notification including options to enable and disable the camera.

FIG. 3A is a schematic representation of an example electronic device 300, depicting an example notification 316 including an option 318 to enable an operation of a camera 306. Example electronic device 300 may be a notebook computer including a display unit 302 and a base unit 304 pivotally, detachably, or twistably connected to display unit 302.

Display unit 302 may house a display 308 (e.g., a touch-screen display). Display 308 may display diverse images such as digital content and photographed images. Example display 308 may be a liquid crystal display (LCD), a light emitting diode (LED) display, an organic light emitting diode (OLED) display, a plasma display panel (PDP), an electro-luminescent (EL) display, or the like. Base unit 304 may house a keyboard 320, a touchpad 322, a battery, and the like. Electronic device 300 may also be equipped with other components such as audio/video devices, sensors, and the like, depending on the functions of electronic device 300.

Further, electronic device 300 may include a power source 310, a sensor 312, and a controller 314 disposed therein. In one example, power source 310, sensor 312, and controller 314 can be disposed in display unit 302, base unit 304, or any combination thereof. In the example shown in FIG. 3A, power source 310, sensor 312, and controller 314 may be disposed in base unit 304. For example, power source 310, sensor 312, and controller 314 may be similar in structure and/or function to power source 204, sensor 206, and controller 208 described with respect to FIG. 2.

As shown in FIG. 3A, camera 306 may be mounted on display unit 302 (e.g., embedded into a top horizontal bezel of display unit 302) and takes a photograph of an external object creating an image. The image of the external object may be a still image or a moving image. In other examples, electronic device 300 may be provided with a plurality of cameras such as a front camera mounted on a front portion of display unit 302, a side camera mounted on a side portion of display unit 302, and a back-facing camera mounted on a back side of display unit 302.

Such cameras (e.g., camera 306) may be utilized by hackers or other unauthorized persons (e.g., via a hacking or malicious program) to take a photograph of an external object during a power-on mode in which camera 306 and display 308 are turned on. The hacking program may collect users personal information and privacy in a state that the user may not realize the photographing operation of camera 306. When camera 306 starts working (i.e., recordation of images), the power consumption may increase beyond a threshold.

Accordingly, when power measured by sensor 312 is greater than the threshold, controller 314 may provide a notification 316 on display 308. In one example, notification 316 may include an option 318 that can be selectable to enable an operation of camera 306. In one example, controller 314 may direct power source 310 to continue to provide the power to camera 306 in response to determining that option 318 to enable camera 306 is selected prior to an expiration of a timer (e.g., timer 214 as shown in FIG. 2). In another example, controller 314 may turn off the power to camera 306 via power source 310 in response to determining that the timer expires prior to the selection of option 318.

FIG. 3B is a schematic representation of example electronic device 300 of FIG. 3A, depicting another example notification 324 including an option 326 to enable camera 306 and an option 328 to disable camera 306. For example, similarly named elements of FIG. 3B may be similar in structure and/or function to elements described with respect to FIG. 3A.

During operation, when power measured by sensor 312 is greater than the threshold, controller 314 may provide notification 324 on display 308. In one example, notification 324 may include an option 326 that can be selectable to enable an operation of camera 306 and an option 328 that can be selectable to disable an operation of camera 306. In one example, controller 314 may direct power source 310 to continue to provide the power to camera 306 in response to determining that option 326 to enable camera 306 is selected prior to an expiration of the timer. In another example, controller 314 may turn off the power to camera 306 via power source 310 in response to determining that the timer expires prior to the selection of any of options 326 and 328. In yet another example, controller 314 may turn off the power to camera 306 via power source 310 in response to determining that option 328 to disable camera 306 is selected prior to the expiration of the timer.

In one example, the components of electronic device 300 may be implemented in hardware, machine-readable instructions, or a combination thereof. In one example, controller 314 may be implemented as engines or modules comprising any combination of hardware and programming to implement the functionalities described herein.

Electronic device (e.g., electronic device 100, 200, and 300 of FIG. 1, FIG. 2, and FIG. 3, respectively) may include computer-readable storage medium comprising (e.g., encoded with) instructions executable by a processor to implement functionalities described herein in relation to FIGS. 1-3. In some examples, the functionalities described herein, in relation to instructions to implement functions of components of electronic device 100, 200, or 300 and any additional instructions described herein in relation to the storage medium, may be implemented as engines or modules comprising any combination of hardware and programming to implement the functionalities of the modules or engines described herein. The functions of components of electronic device 100, 200, or 300 may also be implemented by a respective processor. In examples described herein, the processor may include, for example, one processor or multiple processors included in a single device or distributed across multiple devices.

Figure 4A:
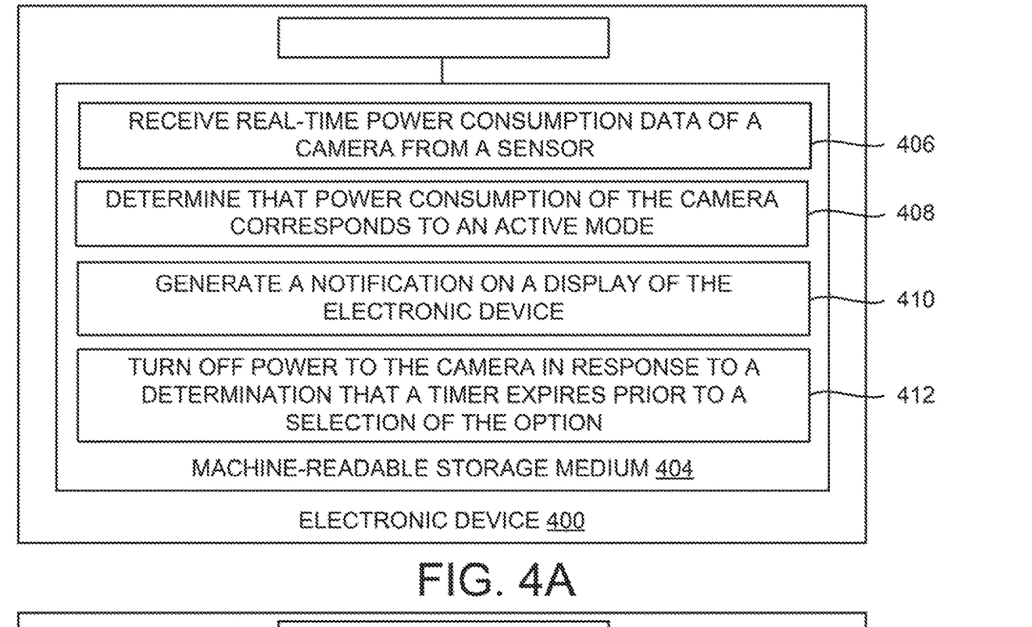
FIGS. 4A and 4B are block diagrams of an example electronic device including a non-transitory computer-readable storage medium, storing instructions to control an operation of a camera.
Figure 4B:
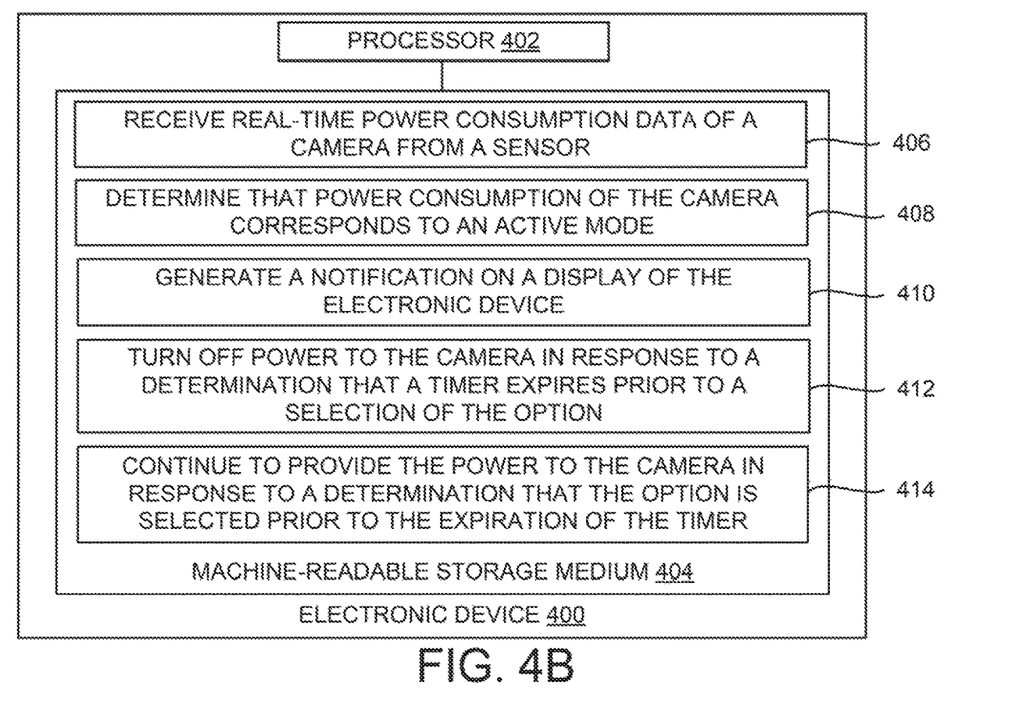

FIGS. 4A and 4B are block diagrams of an example electronic device 400 including a non-transitory machine-readable storage medium 404, storing instructions to control an operation of a camera. Electronic device 400 may include a processor 402 and machine-readable storage medium 404 communicatively coupled through a system bus. Processor 402 may be any type of central processing unit (CPU), microprocessor, or processing logic that interprets and executes machine-readable instructions stored in machine-readable storage medium 404. Machine-readable storage medium 404 may be a random-access memory (RAM) or another type of dynamic storage device that may store information and machine-readable instructions that may be executed by processor 402. For example, machine-readable storage medium 404 may be synchronous DRAM (SDRAM), double data rate (DDR), rambus DRAM (RDRAM), rambus RAM, etc., or storage memory media such as a floppy disk, a hard disk, a CD-ROM, a DVD, a pen drive, and the like. In an example, machine-readable storage medium 404 may be a non-transitory machine-readable medium. In an example, machine-readable storage medium 404 may be remote but accessible to electronic device 400.

As shown in FIG. 4A, machine-readable storage medium 404 may store instructions 406-412. As shown in FIG. 4B, machine-readable storage medium 404 may store instructions 406-414. In an example, instructions 406-414 may be executed by processor 402 to control the operation of the camera. Instructions 406 may be executed by processor 402 to receive real-time power consumption data of the camera from a sensor. The camera may consume low power in an idle mode and high power in an active mode. In one example, the real-time power consumption data of the camera is received from the sensor when a display of electronic device 400 and the camera are in a power-on mode.

Instructions 408 may be executed by processor 402 to determine that power consumption of the camera corresponds to the active mode based on the real-time power consumption data. Instructions 410 may be executed by processor 402 to generate a notification on the display of electronic device 400 in response to determining that the power consumption of the camera corresponds to the active mode. The notification may include an option that can be selectable to allow an operation of the camera.

Instructions 412 may be executed by processor 402 to turn off power to the camera in response to a determination that a timer expires prior to a selection of the option. In one example, the timer may be set to expire after an amount of time (i.e., a duration). The timer may indicate the duration to automatically disable the notification. In one example, instructions 412 may be executed by processor 402 to turn off a power source to disconnect the power to the camera in response to the determination that the timer expires prior to the selection of the option.

As shown in FIG. 4B, instructions 414 may be executed by processor 402 to direct a power source to continue to provide the power to the camera in response to a determination that the option is selected prior to the expiration of the timer.

Figure 5:
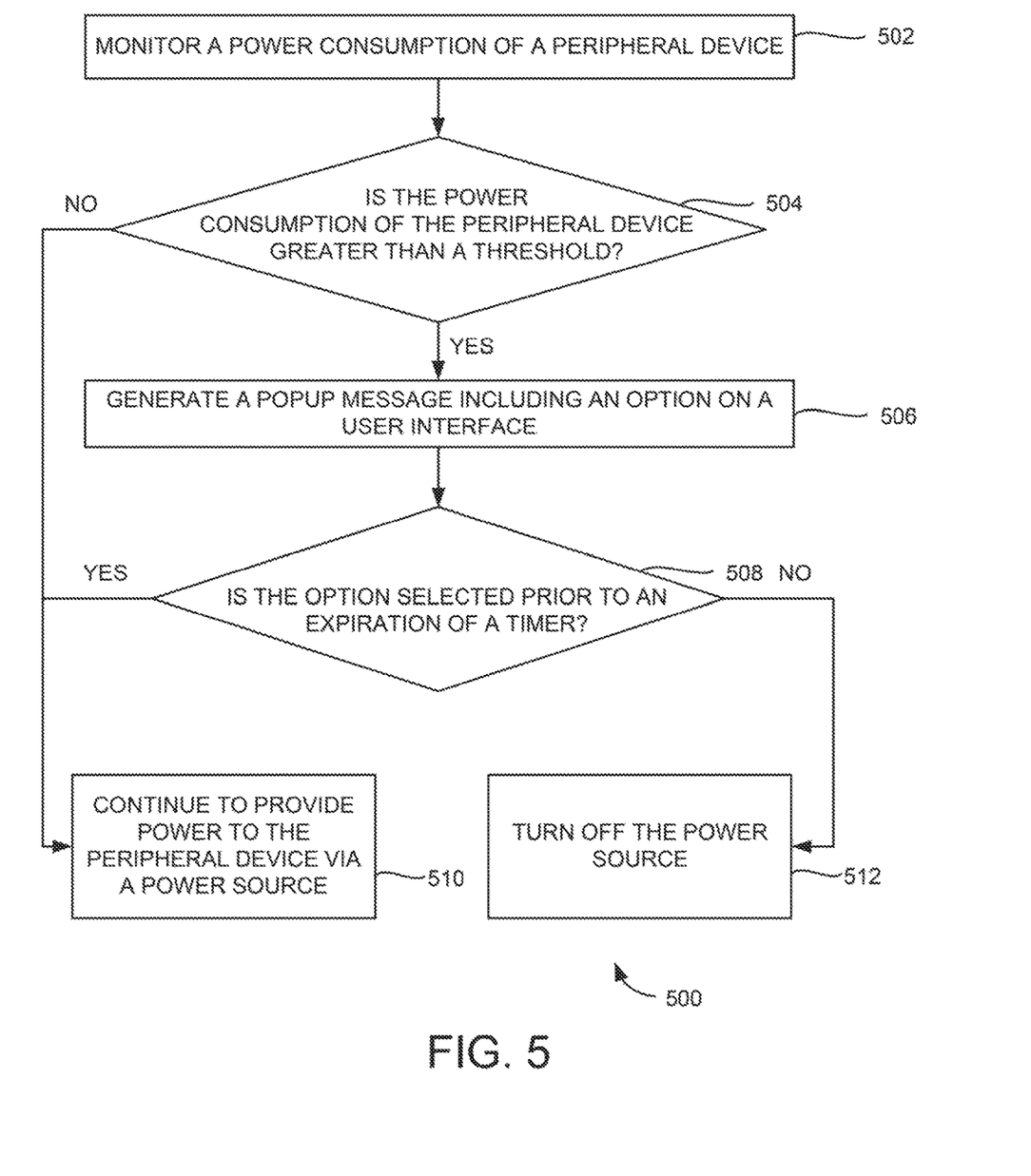
FIG. 5 is a flow diagram for controlling an operation of a camera during a power-on mode of an electronic device.

FIG. 5 is a flow diagram 500 for controlling an operation of a peripheral device during a power-on mode of an electronic device. It should be understood that the process depicted in FIG. 5 represents generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 502, a power consumption of a peripheral device may be monitored via a sensor. Example peripheral device may be a camera or a microphone. The peripheral device may be operated in an idle mode or an active mode. The idle mode may be a low-power consumption mode and the active mode may be a high-power consumption mode to record an image or voice. At 504, a check is made to determine whether the power consumption of the peripheral device is greater than a threshold. The threshold may be an indicative of a power level beyond which the peripheral device enters the high-power consumption mode.

When the power consumption of the peripheral device is not greater than the threshold, at 510, a power source may be directed to continue to provide the power to the peripheral device. In this example, the peripheral device may be operated in the idle mode or the low-power consumption mode.

When the power consumption of the peripheral device is greater than the threshold, at 506, a popup message including an option may be generated on a user interface of the electronic device. At 508, a check is made to determine whether the option is selected (e.g., by a user) prior to an expiration of a timer. If the option is selected prior to the expiration of the timer, at 510, a power source may be directed to continue to provide the power to the peripheral device. In this example, the peripheral device may work in the active mode or the high-power consumption mode to record the image or voice. If the timer expires without the selection of the option, at 512, the power source may be turned off to disable the peripheral device. Thus, examples described in FIGS. 1-5 may protect the privacy of end users via securely turning off the power to the camera or the microphone to prevent unauthorized access to the camera or the microphone.

It may be noted that the above-described examples of the present solution are for the purpose of illustration only. Although the solution has been described in conjunction with a specific implementation thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract, and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. An electronic device comprising:
   a power source to supply power to a peripheral device;
   a sensor circuit to continuously monitor a power consumption of the peripheral device during a power-on mode of the electronic device and an idle mode of the peripheral device, wherein the power used in an active mode of the peripheral device is greater than the power used in the idle mode; and
   a controller coupled to the sensor circuit to:
      detect that the power consumption of the peripheral device is greater than a threshold during the active mode;
      generate a popup message on a user interface of the electronic device based on the detection, wherein the popup message comprises an option; and
      direct the power source to continue to provide the power to the peripheral device in response to a determination that the option is selected prior to an expiration of a timer.

2. The electronic device of claim 1, wherein the controller is to turn off the power source in response to a determination that the timer expires without the selection of the option.

3. The electronic device of claim 1, wherein the threshold is an indicative of a power level beyond which the peripheral device starts working, and wherein the threshold is set based on a power specification of the peripheral device.

4. The electronic device of claim 1, wherein the sensor circuit is to monitor the power consumption of the peripheral device during the power-on mode, in which the electronic device and the peripheral device are turned on.

5. The electronic device of claim 1, wherein the peripheral device is a camera or a microphone.

6. An electronic device comprising:
   a display unit;
   a camera embedded into the display unit;
   a power source to supply power to the camera;
   a sensor to continuously measure the power supplied by the power source to the camera during a power-on mode of the electronic device and an idle mode of the camera, wherein the power used in an active mode of the camera is greater than the power used in the idle mode; and
   a controller coupled to the sensor to:
      determine that the measured power is greater than a threshold during the active mode;
      provide options on the display unit in response to the measured power being greater than the threshold, wherein the options are to enable and disable the camera; and
      control an operation of the camera via the power source based on a selection of the options and a timer.

7. The electronic device of claim 6, wherein the controller is to:
   direct the power source to continue to provide the power to the camera in response to determining that an option to enable the camera is selected prior to an expiration of the timer.

8. The electronic device of claim 6, wherein the controller is to:
   turn off the power to the camera via the power source in response to determining that the timer expires prior to the selection of the options.

9. The electronic device of claim 6, wherein the controller is to:
   turn off the power to the camera via the power source in response to determining that an option to disable the camera is selected prior to an expiration of the timer.

10. The electronic device of claim 6, wherein the timer is set to expire at a threshold time duration.

11. The electronic device of claim 6, wherein the display unit and the camera are turned on during the power-on mode of the electronic device.

12. A non-transitory machine-readable storage medium encoded with instructions that, when executed by an electronic device, cause the electronic device to:
   receive real-time power consumption data of a camera from a sensor, wherein the sensor continuously monitors a power consumption of the camera during a power-on mode of the electronic device and an idle mode of the camera, and wherein power used in an active mode of the camera is greater than the power used in the idle mode;
   determine that the power consumption of the camera corresponds to the active mode based on the real-time power consumption data;
   generate a notification on a display of the electronic device in response to determining that the power consumption of the camera corresponds to the active mode, wherein the notification comprises an option to allow an operation of the camera; and
   turn off the power to the camera in response to a determination that a timer expires prior to a selection of the option.

13. The non-transitory machine-readable storage medium of claim 12, further comprising instructions to:
   direct a power source to continue to provide the power to the camera in response to a determination that the option is selected prior to an expiration of the timer.

14. The non-transitory machine-readable storage medium of claim 12, wherein instructions to turn off the power to the camera comprise instructions to:
   turn off a power source to disconnect the power to the camera in response to the determination that the timer expires prior to the selection of the option.

15. The non-transitory machine-readable storage medium of claim 12, wherein the real-time power consumption data of the camera is received from the sensor when the display and the camera are in the power-on mode.

* * * * *